Figure 1:
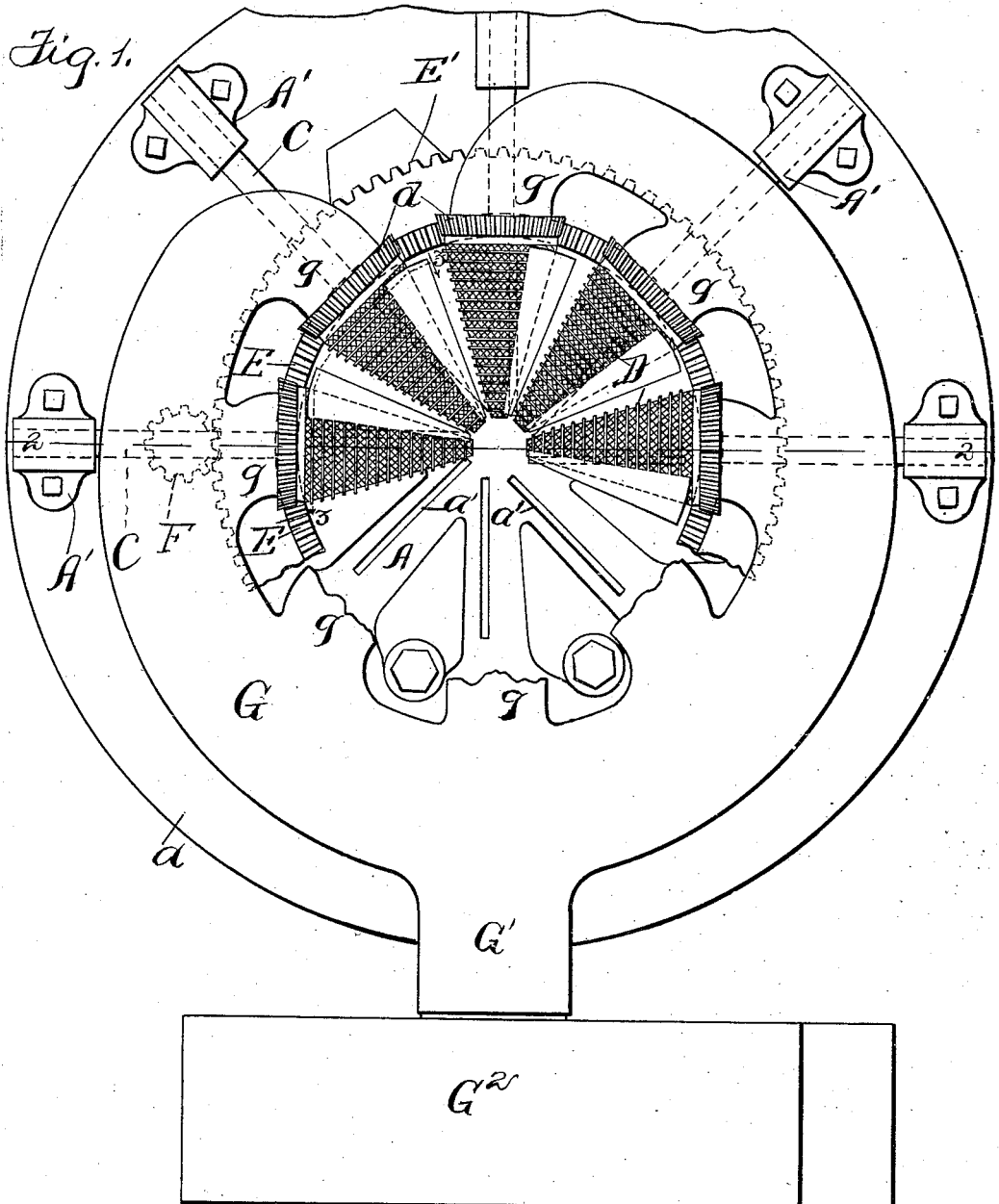

No. 874,606. PATENTED DEC. 24, 1907.
G. A. LOWRY.
COMBINED CONDENSER AND FEEDER MECHANISM FOR PRESSES.
APPLICATION FILED NOV. 15, 1900.

3 SHEETS—SHEET 1.

Witnesses
Wm. W. Rheem
J. S. Keir

Inventor
George A. Lowry
by Mason & Darby
Attys.

No. 874,606. PATENTED DEC. 24, 1907.
G. A. LOWRY.
COMBINED CONDENSER AND FEEDER MECHANISM FOR PRESSES.
APPLICATION FILED NOV. 15, 1900.
3 SHEETS—SHEET 2.
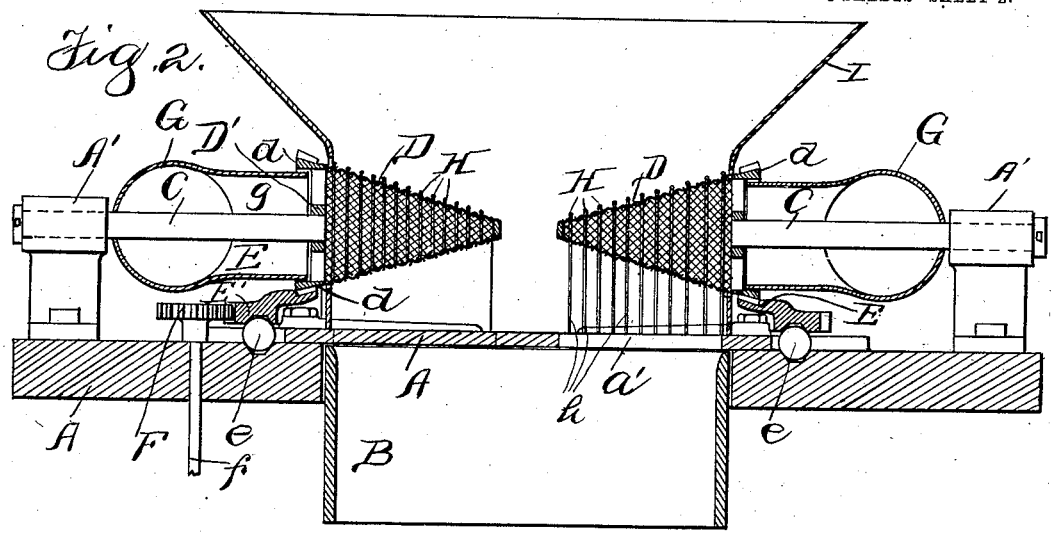
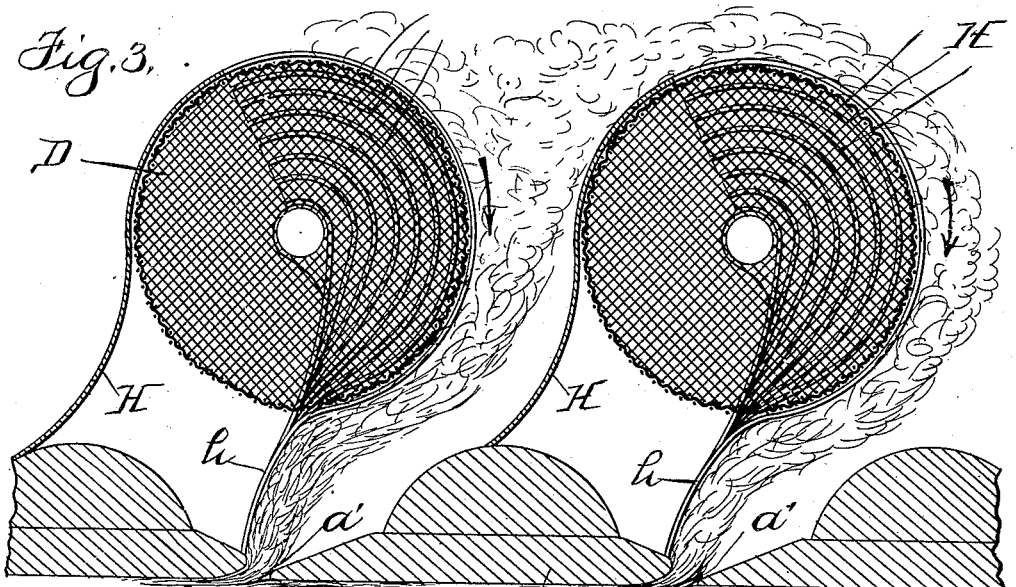
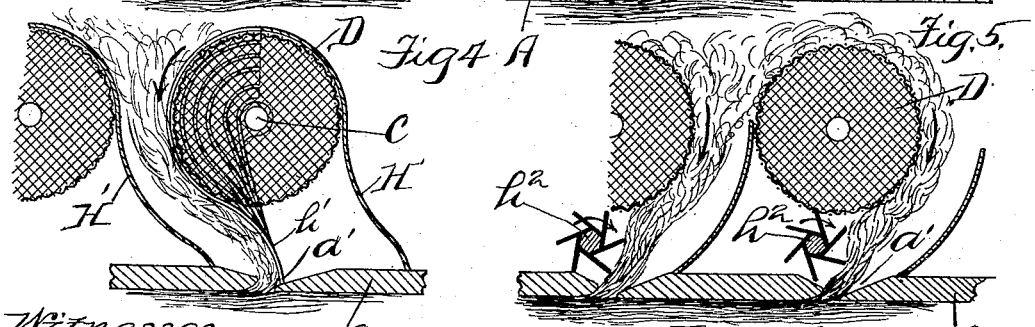
Witnesses.
Inventor
George A. Lowry
by Morton & Darby
Att'ys.

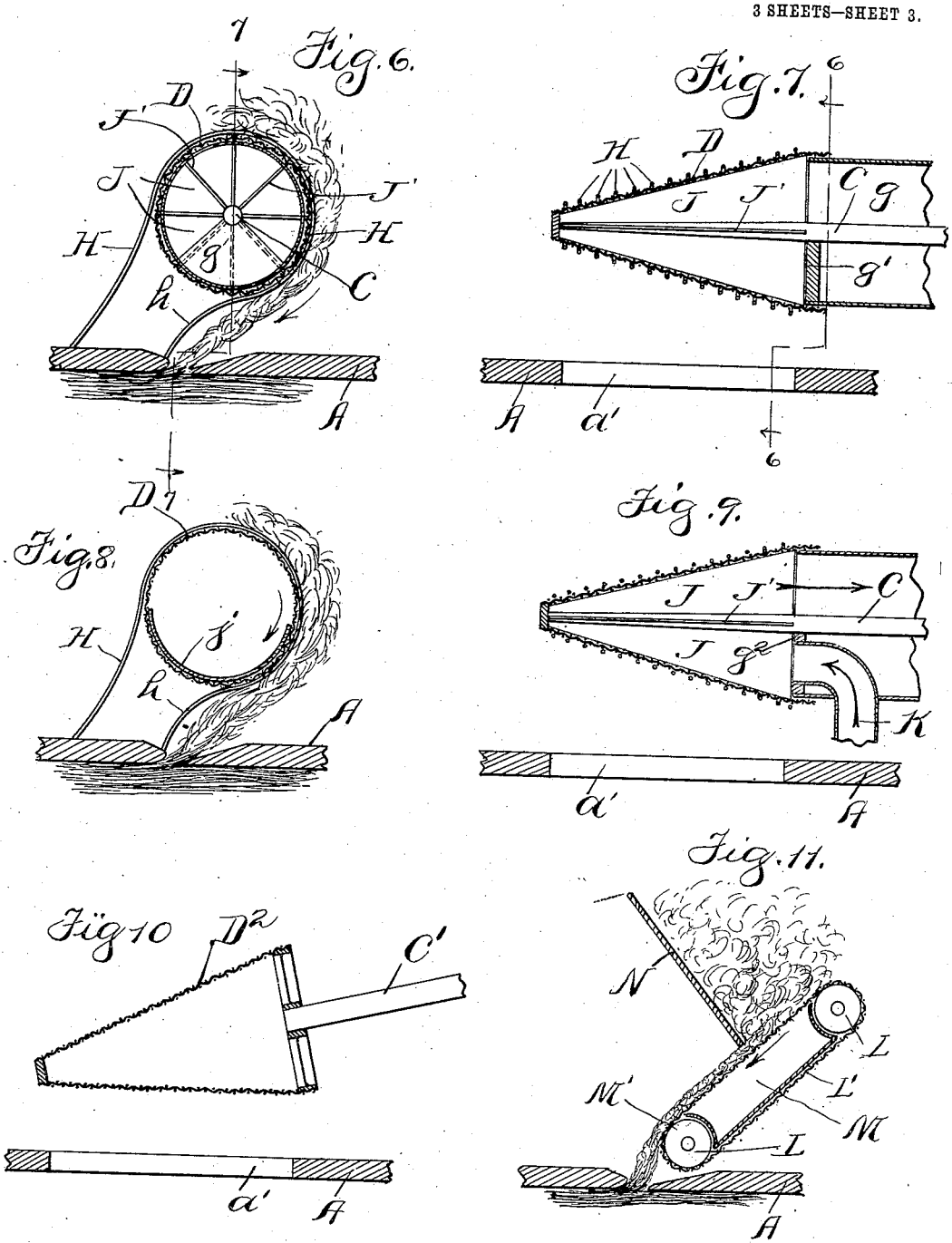

UNITED STATES PATENT OFFICE.

GEORGE A. LOWRY, OF CHICAGO, ILLINOIS, ASSIGNOR, BY MESNE ASSIGNMENTS, TO PLANTERS COMPRESS COMPANY, A CORPORATION OF MAINE.

COMBINED CONDENSER AND FEEDER MECHANISM FOR PRESSES.

No. 874,606.     Specification of Letters Patent.     Patented Dec. 24, 1907.

Application filed November 15, 1900. Serial No. 36,603.

*To all whom it may concern:*

Be it known that I, GEORGE A. LOWRY, a citizen of the United States, residing at Chicago, in the county of Cook and State of Illinois, have invented a new and useful Combined Condenser and Feeder Mechanism for Presses, of which the following is a specification.

This invention relates to a combined condenser and feeder mechanism for presses.

The object of the invention is to provide a construction for presenting or feeding the material to be compressed to the compressing mechanism in layers of comparatively uniform thickness, so that the material will be equally distributed and a bale of uniform density throughout thereby secured.

A further object of the invention is to provide means whereby the material to be compressed—such as cotton, for instance,—may be delivered directly to the compressing apparatus from the gin without any disturbing influence due to the air blast from the gin.

Other objects of the invention will appear more fully hereinafter.

The invention consists substantially in the construction, combination, location and arrangement, all as will be more fully hereinafter set forth, as shown in the accompanying drawings, and finally pointed out in the appended claims.

Referring to the accompanying drawings, and to the various views and reference signs appearing thereon,—Figure 1, is a plan view of a press, showing the application thereto of a combined condenser and feeder embodying the invention. Fig. 2, is a vertical section of the same on the line 2, 2, of Fig. 1. Fig. 3, is a vertical section on the line 3, 3, Fig. 1, looking in the direction of the arrows. Fig. 4, is a view similar to Fig. 3, showing a slightly modified arrangement embraced within the scope of my invention. Fig. 5, is a view similar to Fig. 3, showing a construction in which is employed and associated doffer rolls for disengaging the material from the combined condenser and feeder. Fig. 6, is a broken detail sectional view on the line 6, 6, of Fig. 7, showing a modified form of construction embodying the invention for detaching the mat or mass of material from the combined condenser and feeder. Fig. 7, is a similar view on the line 7, 7, of Fig. 6. Figs. 8 & 9 are views similar to Figs. 6 & 7, respectively, showing other modified arrangements embraced within the scope of my invention. Fig. 10, is a view in diagram illustrating a modified arrangement of the combined condenser and feeder relatively to the feed slot in the head plate. Fig. 11, is a detail broken sectional view illustrating a modified form of combined condenser and feeder embraced within the spirit and scope of the invention.

The same part is designated by the same reference sign wherever it occurs throughout the several views.

In prior patents granted to me, notably, patents 581,600 and 581,601, dated April 27, 1897, and 630,369, dated August 8, 1899, is set forth, described and claimed, a construction of compressing apparatus for fibrous or other material in which are employed an open-ended compression chamber or holder and a slotted head plate, these parts being mounted for relative movement; and in the operation of a compressing apparatus embodying these features of construction the compression chamber or holder is first filled, by hand or otherwise, to an extent such as to cause the filling material to exert a pressure against the inner surface of the head plate. Now, by imparting the relative movement to the compression chamber and head plate and presenting the material to be compressed into proximity to the slot or slots in the head plate, the fibers of such additional material will become engaged by or entangled with the fibers of the previously introduced material, or will be gripped between the surface of the previously introduced material which extends up into the slot in the head plate, and the adjacent or coöperating surface of the lip of the slot, and will be drawn into the compression chamber in the form of thin, flat, highly compressed and condensed sheets or layers, and superposed in this form upon the material previously introduced to the chamber in spiral layers, the material previously introduced being correspondingly advanced through the compression chamber. In this manner the material is highly compressed because it is acted upon in small increments and is formed into a compressed column of high density, from which sufficient lengths to form commercial bales may be detached.

I have discovered that in the practical operation of a compressing apparatus embodying the principles of construction above mentioned, it is desirable that the material to be compressed be presented to the slots in the head plate and drawn into the compression chamber in layers or sheets of substantially uniform thickness throughout, the length of the slot in the head plate, in order that an equal distribution of the material over the radial surface of the bale may be secured, thus forming a bale of uniform density throughout, each of the layers being of uniform thickness from the center of the bale to the periphery thereof. And I have discovered that in the production of such a bale of uniform density the strain upon the press and its operating mechanism and the wear on the parts is less than would otherwise be the case, and that a greater degree of density can be secured by the same amount of power than can be secured where the bale is of irregular density. Moreover, it is desirable to supply the material to be compressed directly from the gin, in the case of cotton, for instance, the blast delivering the lint cotton from the gin serving to direct such lint towards the compressing apparatus. In such case it is desirable to provide means whereby the air may be extracted and so that the material may be relieved of the effects of such air blast.

It is the special purpose of the present invention to provide means for accomplishing these desirable objects, and in carrying out my invention I provide means for preliminarily forming the material into a bat, sheet or layer, for each feed slot in the head plate, each bat or layer being of uniform thickness throughout the transverse width thereof. This result may be secured by associating a combined condenser and feeder with each slot in the head plate, the condenser operating to form the material into a uniform bat, as above indicated, and I also utilize the condenser to draw off or exhaust the air of the blast feed from the gin. Many specifically different constructions may be devised for accomplishing these results.

In the accompanying drawings I have shown various constructions, arrangements and modifications embodying the generic principles of the invention, but I desire it to be understood that in the broad generic application of my invention I do not desire to be restricted to any specific construction illustrated, it being understood that the combined condenser and feeder associated with each slot of the head plate forms the cotton or other material into a layer or bat which is fed or presented directly into the slot in the head plate with which such combined condenser and feeder is associated; and such layers being of substantially uniform thickness throughout their transverse width, it will be seen that an equal thickness of material enters the compression chamber throughout the entire length of each slot, thereby securing uniform density in the mass of compressed material, and hence enabling me to secure the greatest degree of compression with the expenditure of a minimum amount of power.

Referring to the accompanying drawing, reference sign A, designates the head plate; a, the head plate supporting ring; a', the feed slots in the head plate; and B, the compression chamber or sleeve. These parts may be of the usual construction and mounted for relative movement in the usual manner, as fully described and shown in my prior patents above referred to.

In the forms shown in Figs. 1 to 9 inclusive, the combined feeder and condenser embodying the principles of my invention comprises conical shaped rollers or surfaces D, which rollers or surfaces, if designed to operate also as condensers, are preferably in the form of screens. These surfaces, rollers or screens are mounted upon shafts C, each shaft C, being suitably journaled in a bearing A', suitably mounted upon a convenient part of the framing, as, for instance, the head plate supporting ring a, and each shaft is arranged to extend radially with respect to the head plate A, and preferably adjacent to and parallel with a slot a', in the head plate. Where the relative movement imparted to the compression chamber and head plate is a rotative movement, the rollers or surfaces D, may be conical in shape, the apex of the cones being presented towards the center of the head plate. The object of this arrangement is to compensate for the increase in speed of relative movement of the compression chamber and head plate from the center towards the periphery of the head plate, thereby enabling the material to be fed uniformly throughout the length of the slot notwithstanding such increase of relative movement of the compression chamber and head plate. In order to secure the best results, a rotation should be imparted to the rollers or surfaces D. To this end, each roller or surface D, is carried by a spider D', said spider being mounted upon shaft C. Each spider has formed therewith or carried thereby a pinion d, said pinion being arranged to mesh with a drive gear E. A convenient arrangement is shown wherein gear E, is in the form of a ring, which encircles the head plate, and with which engages the gears d, of all the rollers or surfaces D, so that when the gear ring E, is actuated, all the rollers or surfaces D, are simultaneously rotated. If desired, and in order to reduce friction, the gear ring E, may be supported upon the balls e, as clearly shown in Fig. 2, and may be driven by a pinion F, engaging the gear teeth E', connected to or forming part of said gear ring. The pinion F, may be carried upon a shaft f, and rotated from any convenient source.

The operation of the parts so far described is as follows: Rotation being imparted to shaft $f$, the gear ring E, E', is revolved through the engagement of gear F, with said gear E', the movement thus imparted to the gear ring E, E', effecting the rotation of the drums or rollers D, through the engagement of the gears $d$, with said gear E. It is obvious that the means for actuating the drums or surfaces D, may be varied or altered in many ways, which would readily suggest themselves to persons skilled in the art, without departure from the spirit and scope of my invention. It is also obvious that the form of either may be altered and varied in many different ways. For instance, instead of the shafts C, being arranged in parallel relation with respect to the feed slots in the head plate, said shafts may be arranged angularly with respect to said slots so as to bring the adjacent surface of the conical drums or rollers in parallel relation with respect to said slots, as indicated in Fig. 10, wherein reference sign C', designates the shaft, and $D^2$, the roller or drum. It is also obvious that in place of using conical rollers or drums, other forms of feeding devices may be employed. For instance, and by way of illustration, in Fig. 11 is shown an apron construction wherein is employed a traveling belt, band or apron L', operating over rollers or sprockets L, L, in the direction indicated by the arrow. Associated with this form of construction, I may employ a partition N, to aid in directing the material to the traveling apron, said partition also serving to prevent too much of the material from being carried down to the slot at any one time, the traveling apron operating past the lower edge of the partition N, to carry the material in the form of a bat of uniform thickness and to deliver the same to the feed slot in the head plate, as clearly indicated. In the case where this feeding device is also combined as a condenser for permitting the air of the gin feed blast to be withdrawn or extracted therefrom, the carrier may be perforated to permit the air to escape or to be drawn off.

It is obvious that many different constructions may be employed for extracting or drawing off the air of the gin blast feed. In the form shown in Figs. 1 & 2, as illustrative of an operative construction embodying this feature of my invention, I arrange a flue G, upon a convenient support, and provide the same with a branch flue $g$, adapted to connect with each of the drums or rollers D. The main flue G, connects with an outlet G', with which is connected an exhaust fan $G^2$. By this arrangement the air of the gin blast feed may be readily exhausted or extracted from the mass of lint cotton or other material as delivered from the gin. If desired a hopper I, may be employed to receive the lint cotton or other material to be compressed, and which serves to direct the same to the surface of the feeders D. The effect of the suction created through the flues G, and the branches $g$, which extend into the drums or rollers D, and which suction is created by the operation of the fan $G^2$, is to cause the cotton or other material to cling to the outer surface of the rollers or drums D. It is therefore desirable to provide means for detaching such material from the surfaces of the rollers or drums D. Many different constructions for accomplishing this result may be devised and still fall within the spirit and scope of my invention. One form of means is shown, wherein I employ a series of wires or strippers H, and arrange the same to extend around the surface of the drums or rollers, said wires or strippers being secured to the head plate, and the ends $h$, thereof leading down or towards the edge of the lip of slot $a'$, and as the cotton or other material is carried around by the surfaces or drums D, in layers or bats of more or less equal thickness, the wires $h$, will strip such bats or layers from the drums and direct the same into the slots, as clearly indicated in Fig. 3.

In Fig. 4 is shown a slightly modified arrangement, wherein the drums or rollers D, rotate in a direction opposite to that illustrated in Fig. 3, as clearly indicated by the arrows. In this arrangement the ends $h$, of the stripper wires H', which operate to strip the bat or sheet from the surface of the roller or drum D, lead to the near side or lip of the slot in the head plate.

In Fig. 5 is shown another modified arrangement, wherein doffer rolls $h^2$, are employed to strip the material from the drums, instead of stripper wires. These doffer rolls comprise rotating shafts upon which are secured flaps of leather or rubber, or other suitable material, which are more or less flexible, thereby allowing a more or less close contact with the periphery of the drum; and by revolving said doffer rolls in a direction opposite to that in which the drums D, revolve, the bat or sheet of material is detached from the surface of the drum D, thereby, and directed into the slot of the head plate.

It may sometimes occur that the stripper wires $h$, $h'$, are not sufficient to strip the cotton from the drums at the required point. My invention therefore includes and contemplates the provision of means for aiding in the stripping of the bat of material from the surface of the feeders. In Figs. 6, 7, 8 & 9, are shown various arrangements for accomplishing this purpose, wherein the suction of the air through the feeder drums may be cut off at a certain point of the periphery of the drums as such surface approaches the slot in the head plate, thereby allowing the bat of cotton or other material to drop away from the surface of the drum more readily. One arrangement for accomplishing this purpose is shown in Figs. 6 & 7, wherein the drums D, are divided into compartments J, by means of division walls or partitions J', and a portion of the flue $g$, is partitioned off at a point near where the cotton is designed to leave the drum, said partition being indicated at $g'$. It will be seen from this description that two of the compartments J, will always be cut off from the suction of the air and relieved of the suction effect, and consequently when the cotton or other material reaches the point where this suction is cut off, and being relieved of the suction effect exerted thereon, will readily be stripped from the surface of the feeder drums. It will also be seen that the area of screen surface exposed to suction is practically constant in area, each compartment being under full draft during the whole time that cotton is being deposited upon it. Since the exhaust mechanism is constant in operation it follows that suction is uniform throughout the whole exposed surface of the condensing rolls, and the layer of cotton deposited is uniform in depth and density.

In Fig. 8 is shown another arrangement for accomplishing this result. In this instance a stationary plate $j$, is arranged inside of the drum as a shield for a portion of the surface thereof at a point where it is desired to strip the material from the outer surface of the drum. This shield prevents the suction effect on that portion of the surface of the drum which is passing over or in contiguous relation with respect to such shield.

It is obvious that many other constructions and arrangements may also be employed for accomplishing the same results.

Another instance is disclosed in Fig. 9, which construction is similar to that shown in Figs. 6 & 7, wherein the drum D, is divided into compartments J, by means of the partitions J', and a portion of the interior of the drum being cut off from the suction blast by means of a partition $g^2$. In this construction, however, as shown in Fig. 9, a blast may be directed through partition $g^2$, by means of a pipe K, delivering therethrough. From this arrangement it will be seen that the surface of the drum, at the point where it is desired or permissible for the material to stick or adhere to the surface of the drum, will be subjected to the effects and influence of a suction from the inside; and at the point where it is desired that the material be stripped from the surface of the drum, an inside blast is employed which aids in stripping or detaching the material from the surface of the drum.

In the construction shown in Fig. 11, in which is employed an endless carrier, belt or band, the suction of air is provided in a chamber M, over which the belt or carrier operates, such suction being cut off at the point M', to permit the material to be delivered or detached from the endless band at the point nearest the slot in the head plate.

Many other specifically different constructions embodying the principles above set forth would readily suggest themselves to persons skilled in the art and still fall within the spirit and scope of the invention.

While in the drawings various constructions illustrative of the principles involved are shown as applied to a compressing apparatus of the type wherein the cap plate is stationary and the compression chamber is designed to revolve relatively thereto, it is obvious that the principles of the invention are equally well adapted and applicable to a construction wherein the cap plate revolves and the compression chamber is stationary. Moreover, the invention may be applied to a construction of compressing apparatus wherein the relative movement of the head plate and chamber reciprocate relatively to each other, that is, where the relative movement of the head plate and chamber is a reciprocatory movement, and the construction illustrated in Fig. 11 is illustrative of such an arrangement.

From the foregoing description it will be observed that the surfaces D, L', serve as condensers for abstracting the air, sand, or other foreign material, from the cotton or the like, thereby relieving the material to be compressed of the effect of the gin feed blast; and also as feeders, the function of which is to form the material into bats or layers of substantially uniform thickness and present the same uniformly throughout the entire length of the slots in the head plate, whereby the layers of material in the bale will be of uniform density throughout.

It is believed that the operation of the various constructions and modifications will be readily comprehended from the foregoing description taken in connection with the accompanying drawings.

Having now set forth the object and nature of my invention and various constructions embodying the principles thereof, and having described such constructions, their function and mode of operation, what I claim as new and useful and of my own invention, and desire to secure by Letters Patent of the United States, is:

1. In a press, and in combination with a compressing device, a hopper arranged to deliver material by gravity, a screen within the hopper adjacent to the compressing device, and means for drawing air through the screen, a constant area of screen surface being exposed to the action of the exhaust means, and the exhaust means being constant in action.

2. In a press, and in combination with a compressing device, a hopper arranged to deliver material by gravity, a screen within the hopper adjacent to the compressing device, and means for drawing air through the screen, a constant area of screen surface being exposed to the action of the exhaust means, the exhaust means being constant in action, and means to guide material from the screen to the compressing device.

3. In a press, and in combination with a compressing device, a hopper arranged to deliver material by gravity, a moving screen within the hopper adjacent to the compressing device, and means for drawing air through the screen, a constant area of screen surface being exposed to the action of the exhaust means and the exhaust means being constant in action.

4. In a press, and in combination with a compressing device, a hopper arranged to deliver material by gravity, a moving screen within the hopper adjacent to the compressing device, and means for drawing air through the screen, a constant area of screen surface being exposed to the action of the exhaust means, the exhaust means being constant in action, and means to guide material from the screen to the compressing device.

5. In a press, and in combination with a compressing device, a hopper arranged to deliver material by gravity, a moving screen within the hopper adjacent to the compressing device, and means for drawing air through the screen, a constant area of screen surface being exposed to the action of the exhaust means, the exhaust means being constant in action, means to relieve from the action of said exhaust means that portion of the screen adjacent to the compressing device, and means to guide material from the screen to the compressing device.

6. In a press, compressing devices including a head plate or cap having a plurality of slots arranged approximately radially, in combination with a plurality of screens, means for drawing air through the screens, and means to guide material from the screens toward the slots.

7. In a press, compressing devices including a head plate or cap having a plurality of slots arranged approximately radially, in combination with a plurality of moving screens, means for drawing air through the screens, and means to guide material from the screens toward the slots.

8. In a press, compressing devices including a head plate or cap having a plurality of slots arranged approximately radially, in combination with a hopper, a plurality of moving screens within the hopper, means for drawing air through the screens, and means to guide material from the screens toward the slots.

9. In a press, compressing devices including a head plate or cap having a plurality of slots, a plurality of radially arranged conical screens, means for exhausting air from within the screens, and means to guide material from the screens toward the slots.

10. In a press, compressing devices including a head plate or cap having a plurality of slots, a plurality of radially arranged conical screens, means for exhausting air from within the screens, means to rotate the screens each on its axis, and means to guide material from the screens toward the slots.

11. In a press, compressing devices including a head plate or cap having a plurality of slots, a plurality of radially arranged conical screens, means to rotate the screens each on its axis, longitudinal partitions within the cones dividing each into sections, and an air exhausting mechanism communicating with the ends of those sections which are remote from the slots.

12. In a press, compressing devices including a head plate or cap having a plurality of slots, a plurality of radially arranged conical screens, means to rotate the screens each on its axis, longitudinal partitions within each cone dividing the same into sections, an air exhausting mechanism communicating with the ends of those sections remote from the slots, and means to guide material from the screens toward the slots.

13. In a press, compressing devices including a head plate or cap having a plurality of slots, a plurality of radially arranged conical screens, means to rotate the screens each on its axis, longitudinal partitions within the cones dividing each into sections, an air exhausting mechanism communicating with the ends of those sections which are remote from the slots, and an air blast mechanism communicating with the ends of those sections that are near the slots.

14. In a press, compressing devices including a head plate or cap having a plurality of slots, a hopper adapted to hold fibrous material, a plurality of radially arranged conical screens within the hopper, means for exhausting air from within the screens, means to rotate the screens each on its axis, and means to guide material from the screens toward the slots.

15. In a press, compressing mechanism including a head plate or cap having a plurality of slots arranged approximately radially in combination with a hopper adapted to hold fibrous material, a plurality of feeding devices within the hopper, means for actuating the same for presenting the material to said slots, and an air exhaust mechanism communicating with said feeding devices.

16. In a press, compressing mechanism including a head plate or cap having a plurality of slots, a plurality of rotatable feed drums arranged to present to said slots the material to be compressed, a hopper in combination therewith, an air exhaust mechanism adapted to communicate through each drum with the material in the hopper, and means for shielding from the air exhaust the portion of each drum's surface adjacent to its associated slot.

17. In a press, in combination with a compressing mechanism including a head plate or cap having a plurality of radial slots and means to produce relative rotation between the cap and the compressed material, a hopper to hold fibrous material, conical feeding drums arranged radially within the hopper, one for each slot, and gearing connected to each drum, adapted to rotate all of said drums simultaneously.

18. In a press, in combination with a compressing mechanism including a head plate or cap having a plurality of radial slots and means to produce relative rotation between the cap and the compressed material, a hopper to hold fibrous material, conical feeding drums arranged radially within the hopper, one for each slot, and a rack gear arranged to rotate each drum.

19. In a press and in combination with the compressing mechanism, screen conveyers for presenting the material to such compressing mechanism, partitions behind each screen, dividing the same into sections, and means to subject the front of each screen to an air current passing therethrough in direction to draw material thereto and afterward to subject the same to an air current in direction to repel material therefrom adjacent to the compressing mechanism.

20. In a press, and in combination with compressing mechanism, feed rollers or drums arranged to present the material to said compressing mechanism, and stationary strippers encircling the surface of said rollers or drums for stripping the material from such surface and guiding the same to the compressing mechanism.

21. In a press, in combination with a compressing mechanism including a head plate or cap having a plurality of radial slots and means to produce relative rotation between the cap and the compressed material, a hopper to hold fibrous material, perforated conical feeding drums arranged radially within the hopper, one for each slot, an air suction to draw material to said drums, and a cut-off for the suction to permit separation of the material from the drums.

22. In a press, compressing mechanism including a slotted head plate, in combination with a feed roller or drum for presenting the material to the slot in said head plate, means for actuating said roller or drum, and strippers encircling said drum and terminating adjacent to the slot in said head plate for stripping the material from the drum and directing the same to the slot in the head plate.

23. In a press, a compressing mechanism including a relatively rotatable compression chamber and head plate, said head plate provided with slots or openings therethrough, in combination with a conical feed roller arranged outside but adjacent to the slot in said head plate, and means for rotating said feed roller, whereby the material to be compressed is formed into a bat of uniform thickness and presented uniformly throughout the length of the slot in the head plate to produce a compressed mass of uniform density.

In witness whereof, I have hereunto set my hand this ninth day of November, 1900, in the presence of the subscribing witnesses.

GEORGE A. LOWRY.

Witnesses:
 LOUISE CORNELL,
 WM. M. RHEEM.